United States Patent Office 3,649,493
Patented Mar. 14, 1972

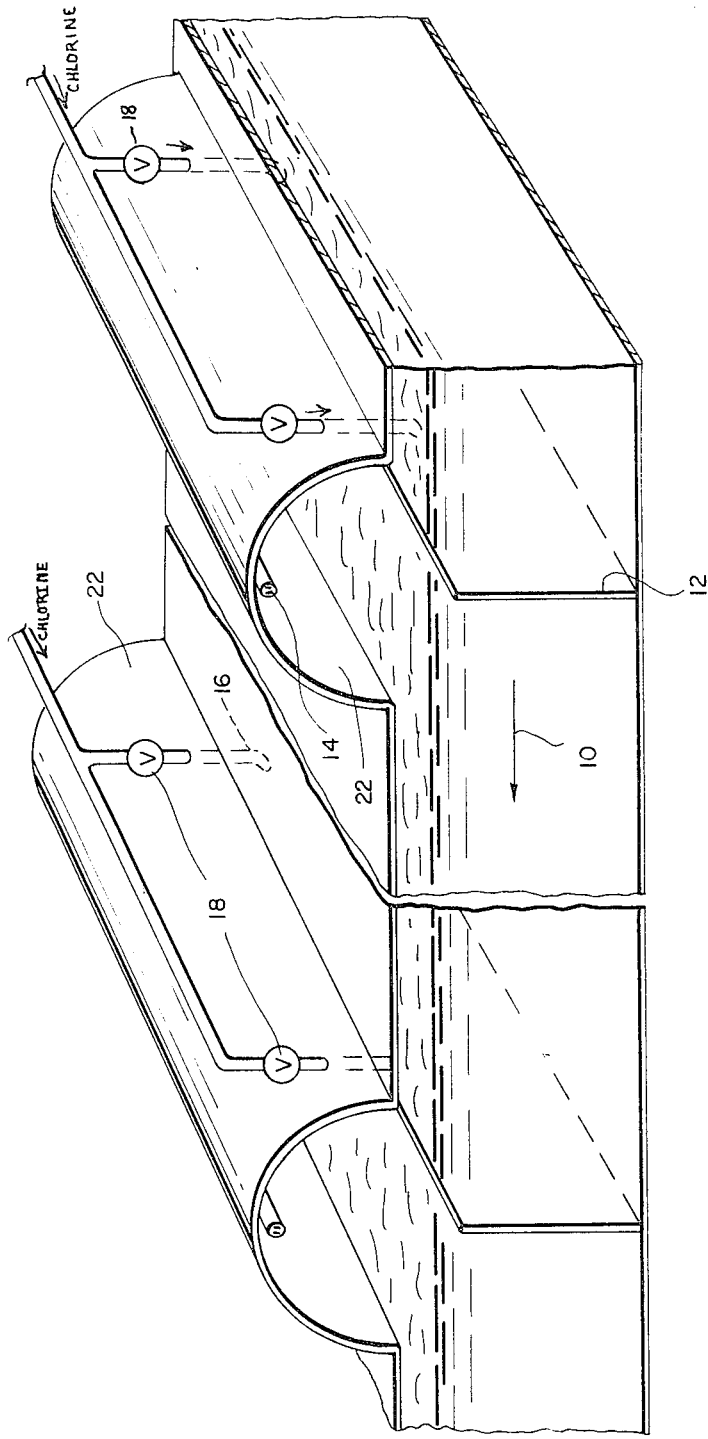

3,649,493
PROCESS OF PURIFYING WATER WITH ACTIVE HALOGEN COMPOUND AND ACTINIC RADIATIONS
Alfred Meiners and Evan P. Shea, Kansas City, Mo., assignors to Midwest Research Institute, Kansas City, Mo.
Filed July 10, 1969, Ser. No. 840,771
Int. Cl. C02b 3/08
U.S. Cl. 204—157.1                 19 Claims

ABSTRACT OF THE DISCLOSURE

Contaminated waters have their oxidizable impurities materially reduced by oxidation with a hypohalous acid forming compound in the presence of actinic light, irradiated from a source maintained in close proximity to the water.

---

This invention relates to treatment of waters to modify the impurities therein by oxidation with active halogen, activated with actinic radiations such as ultraviolet light irradiated in the range of 250 to 550 mu from a source in close proximity to the impure water being treated.

According to the present invention we have found that impurities in the water can be destroyed by oxidation with an active halogen compound irradiated with actinic radiations in the range of 250 to 550 mu such as ultraviolet light in a short treatment period of usually less than forty minutes and preferably less than thirty minutes, the active halogen being added to the water in economically small quantities while exposing the waste water to the actinic light rays usually at a wave length in the range of about 250 to 500 mu at a radiation intensity sufficient to provide less than about thirty watt-minutes per gallon.

Contaminated waste waters are treated according to this invention to reduce or remove the contamination variably, depending upon the nature of the contaminant and the degree of contamination and ultimate purity desired. Thus, normally the waste water to be treated may be heavily or lightly contaminated with easily or difficulty oxidizable organic materials or even with oxidizable inorganic materials. The present treatment can be applied to completely oxidize and thus destroy the organic components. It can also be applied to the water to only partially oxidize and destroy the contaminating components, oxidizing to convert them to an acceptable form. Again, in the case of lightly contaminated, such as bacterially infected waters, the applied oxidation may be very light, only sufficient to destroy the bacteria, but insufficient to completely oxidize the organic substance thereof, as desired. In the case of inorganic components, the oxidation may be effected to convert the inorganic components to a more desirably oxidized form or merely to an insoluble form in which the inorganic residues will precipitate from the waters. Thus the waters will be treated in the present actinic light-activated oxidation with active halogen while exposing them to irradiation to whatever degree of oxidation is useful or economically practical to effect the intended purpose.

The most active form of halogen compound hereof is that of hypohalous acid, typified by hypochlorous, hypobromous and hypoiodous acids. For example, hypochlorous acid is formed in the water by addition of the corresponding free chlorine typified by the following equation:

$$Cl_2 + H_2O = HOCl + HCl$$

Hypochlorous acid is the most active form of chlorine in the radiation-catalyzed reaction. Hypochlorous acid in water is slightly acidic and most stable at a pH of about 5.

The following table shows the dissociation of hypochlorous acid as a function of pH at 25° C., and, consequently, indicates the most active pH.

| pH: | HOCl undissociated percent |
|---|---|
| 5.0 | 99.6 |
| 6.0 | 96.5 |
| 7.0 | 73.0 |
| 7.4 | 50.0 |
| 8.0 | 21.0 |
| 9.0 | 2.7 |
| 10.0 | 3 |

Where elemental chlorine is added to water to form the hypochlorous acid, according to the equation above, it will be most stable and assert its strongest oxidizing effect at a pH of around 5, diminishing progressively, as the table shows, up to a pH of approximately 10. Consequently, at pH's progressively above 5, the oxidizing effect is diminished because the chlorine in the form of the hypochlorous acid correspondingly diminishes. On the acid side, as the acidity of the water is progressively reduced below 5, for instance below 3.5, the hypochlorous acid will decompose to free chlorine. Consequently, the oxidation is best effected at pH's below 10, with greatest effect around 5, and a preferred practical pH range is about 4 to 7; that is, neutral to slightly acid.

Commonly commercially available sources of hypohalous acid are the free halogen per se, which may be added to the contaminated water to form the hypohalous acid corresponding to whichever halogen was used. Halogenated waters and hypochlorite solutions of alkali-forming metals such as sodium, lithium or calcium hypochlorites may be dissolved in the water as preformed solutions. Obviously in the use of such "bleaches" the alkali-forming metal tends to raise the pH so that the active quantity of hypohalous acid, as shown in the table above, is reduced. Where a commercial bleach liquid such as calcium hypochlorite or sodium hypochlorite is used, the pH of the water may be adjusted to the desired pH for optimum oxidizing effect. Sometimes the water may have a buffering compound dissolved therein for purposes of maintaining the water at a slightly acid to neutral pH, preferably by dissolving in the water such buffering salts as sodium bicarbonate or sodium mono- or di-acid phosphate, whereby the pH will remain in the desired range.

Other active halogen-releasing compounds may be used to provide a source of halogen to the water which in turn becomes available in the form of the hypohalous acid. Such compounds as chloro amino compounds referred to generically as chloramines, and which include compounds wherein available chlorine is bonded to nitrogen, are a form in which the chlorine becomes hydrolyzed to the hypochlorous acid form. Such compounds are monochloramine, dichloramine, chloramine-T, dichloramine-T, N-chloro sulfonamides and various cyclic and heterocyclic amino nitrogen compounds having chlorine attached to the nitrogen such as the chlorinated cyanurates and chlorinated hydantoins, all known, commercially-active organic chloramine compounds are useful. Obviously, analogous N-bromo and N-iodo compounds are also useful. These N-halo compounds, as stated, also form hypohalous acid in solution. Some specially chlorinated inorganic compounds such as chlorinated trisodium phosphate are also useful.

All of the halogen compounds thus listed are referred to herein by the generic term "active halogen compound" by which it will be understood all such compounds listed which form hypohalous acid when added to water.

The waste water is treated by adding the active halogen compound directly or as a preformed solution to the contaminated water to be purified while exposing the halogen-containing water to ultra-violet light irradiated from a source maintained in close proximity to the water for a short period of time. Much of the oxidation takes place rapidly in a few minutes, such as above five minutes, and most of the useful oxidation usually takes place in less than about fifteen minutes. After about forty minutes of exposure, little or substantially no useful further oxidation takes place for most of the contaminated waters. Consequently, the exposure time to the actinic light source of the active halogen-containing waste water is usually less than forty minutes and oftimes is less than fifteen minutes. Substantial oxidation of impurity therein takes place so rapidly during irradiation that where it is not intended to completely oxidize all of the contaminants in the water, even less than one minute of exposure will suffice to effect significant oxidation; for instance, as little as one second exposure time may be sufficient for some purposes. Thus, where it is desired to merely disinfect water, to destroy and kill live bacteria, the active halogen-containing water can be exposed to the light source from about one second up to about half a minute, usually not exceeding one minute. While the bacteria may be only slightly or partially oxidized in the process, complete oxidation does not result. It is not necessary for purposes merely of disinfecting or killing the bacteria therein to completely oxidize all of the water contaminants. Conversely, in heavily contaminated waters which may also contain bacteria such as sewage plant effluent, where substantial oxidation is to be effected, the destruction of bacteria also results by the substantial oxidation that is applied. Obviously the concentration of hypohalous acid measured in terms of the concentration of halogen initially supplied to the water can be as low as needed for the oxidation results intended.

Ordinarily the water will be supplied with from about 5 to 40 p.p.m. of chlorine with correspondingly two to three times that quantity where the halogen is bromine or iodine to effect the oxidation. However, the larger quantities up to about 300 parts per million can be used, but they are less economical. Most economically the 5 to 40 parts per million concentration range of halogen will be maintained in the water during the oxidation and it is not necessary to use a larger quantity. Moreover, usually not all of the halogen needed will be supplied in a single addition to effect the total oxidation desired. Rather, the quantity of active halogen is supplied to the water in increments at a rate corresponding, at least roughly, to the rate at which the halogen is consumed i.e. the rate at which the oxidation is effected. Surprisingly, the larger quantities of halogen than that stated do not increase the rate of the oxidation. Hence, it is not economical to supply halogen at a higher concentration since the rate of oxidation, water purification, is not improved thereby, and the greater concentration of halogen is thereby wasteful and uneconomic.

The active halogen compound may be supplied in the case of use of elemental chlorine by bubbling the gaseous chlorine directly into the water to be treated, sometimes from several inlet sources to evenly distribute it in the water and preferably in or near the region of light exposure. Where the active halogen compound is a solid or liquid, as in the use of bleaching powders or liquids or powdered chloramines, it is merely added to the water to form a concentrated solution, which in turn is added to the water being purified. The liquid or solid active halogen compound can also be added to the water with agitation in quantity to effect the desired concentration.

The incremental addition of active halogen compound at several inlets lends itself to continuous treatment of flowing water. In this case, the exposure of the halogen-containing water to the source of actinic radiations such as ultraviolet radiation sources, also occurs at several locations along the flowing water. This type of treatment allows the consumption of the minimal quantity of halogen as the water flows from one supply point to the next. Thus, the water need never be supplied with sufficient halogen at any one point or time by exposure to effect the total, ultimately-desired oxidation. This type of treatment is particularly useful in the instance of treatment of waters infected with bacteria for purposes only of destroying the bacteria where very minute quantities of halogen such as from one to ten parts per million may be supplied incrementally at several points, while rapidly flowing the water near the actinic light sources to effect an exposure thereto in the limited time range i.e. a total of less than one minute. In this manner, while complete treatment including the desired amount of oxidation is not effected immediately, over the course of flow, nevertheless, the water is adequately disinfected, efficiently destroying by killing bacteria therein.

The source of ultraviolet light is usually a mercury arc which is desirably of the high-pressure mercury-arc type because this source provides very intense radiation throughout the ultraviolet and visible regions, especially between 250 and 550 m$\mu$. However, the low-pressure mercury arc, which irradiates predominantly at the relatively short wave length of 253.7 m$\mu$, is also useful and sometimes preferred because short wave length radiation, although not capable of penetrating waste water as far as longer wave length radiation, does provide a greater amount of energy to the hypochlorous acid molecules.

Other commercial sources of ultraviolet light generating means including arcs formed in the presence of inert gases such as helium, neon, xenon, hydrogen, krypton and argon, as well as other commercial UV arc lights such as carbon, cadmium, zinc, tellurium or magnesium, may be used. The ultraviolet light generating lamp, of which all of those listed are commercially available, may be immersed in the water which flows by the light source suspended within the body of water. Under certain circumstances incandescent sources, such as incandescent tungsten or tantalum, can be employed as the source of ultraviolet and visible radiation. Alternately, the light source may be supported above the water surface, the UV light being radiated downward thereon while the water, by baffling, is constrained to relatively thin layers for optimum UV light exposure, the water being flowed or circulated to obtain the desired effect, as stated.

The water may also be exposed to variable light quantities, depending upon the extent of oxidation to be effected. For instance, in the instance where the material in the water is to be substantially oxidized, the light source may be irradiated in an intensity of about 0.5 to 30 watt-minutes per gallon and usually less than about fifteen watt-minutes per gallon will suffice. Where the water is merely to be disinfected and exposed for a very short period of time, that exposure may be at a rate of from about one-tenth (0.1) of one second to five minutes of light irradiations in a wave length of 250 to 550 mu at an intensity of 0.5 to 5 watt-minutes per gallon of water being treated.

The temperature of the water is not critical and the water will usually be treated at any practical handling temperature, usually less than 150° F. and down to freezing.

The following examples illustrate the practice of this invention:

Examples I–III compare the rate of oxidation of chlorine upon several selected compounds, the same quantity of compound being placed both in a clear glass bottle irradiated with a 100 watt UV lamp (GE high pressure mercury arc lamp), the effective wave length being between about 300 to 550 mu (because the filtering action of the glass bottle on wave lengths below about 300 mu) maintained approximately six inches from the bottle, and in a light opaque brown glass bottle.

EXAMPLE I

Two solutions of glucose having a chemical oxygen demand (COD) of 1070 mg./l. were treated with chlorine water containing sufficient chlorine to eliminate 607 mg./l.

of the COD assuming 100% efficiency. One solution was treated in a one liter brown bottle and the other was treated in a one liter clear glass bottle, each at a pH of 5, and the concentration of active chlorine was thereafter measured. After one hour only about five percent of the chlorine had been consumed by the glucose in the brown bottle. In the clear glass bottle after irradiation for 20 minutes, 95% of the chlorine was consumed, and afer one hour all of the chlorine had disappeared. The following day 83% of the chlorine content of the brown bottle was still present.

In a second experimental run a smaller quantity of glucoise COD=425) of 0.4 gram (2.2 mM.) was similarly irradiated in a clear glass bottle and substantially all of the chlorine was consumed, the quantity of chlorine used in this experiment having been adjusted to provide sufficient chlorine to effect complete oxidation of the glucose to carbon dioxide.

EXAMPLE II

In a series of additional experiments, glucose, ethanol, isopropyl alcohol and acetaldehyde were each irradiated in the presence of chlorine water and the experimental results are summarized in the following table:

The data shows that the rate of oxidation of different compounds may vary considerably from compound to compound but in any case a very substantial amount of oxidation will take place in a comparatively short time.

It will be apparent that the ultraviolet light energy becomes progressively absorbed by the contaminants in the waste water, so that at a specific water depth measured from the UP light source or from the surface of the water i.e. the point of incidence of the UV light, the light penetration ceases for practical purposes. The depth of penetration will vary, depending upon the wave length of radiation and upon the concentration and light absorptive characteristics of the impurities in the water. A practical depth of penetration for low-pressure mercury arcs is two to five inches from the surface. Low-pressure arcs emit radiation at the relatively short wave length of 253.7 m$\mu$. However, longer wave lengths of radiation penetrate waste water to a much greater depth. For example, the most intense wave length of radiation from a high-pressure mercury arc at 366 m$\mu$ will penetrate waste water to the extent of 12 to 30 inches.

In the treatment of water only for the purpose of obtaining a bactericidal or germicidal effect, both the quan-

SUMMARY OF UV-CATALYZED CHLORINE OXIDATION EXPERIMENTS

| | Simulated waste water samples | | | | | |
|---|---|---|---|---|---|---|
| | A | B | C | D | E | F |
| Initial Cl$_2$ concentration (COD equivalents, mg./l.) [1] | 510 | 1,180 | 1,040 | 543 | 815 | 1,120 |
| Initial irradiation period (hrs.) | 1.0 | 1.75 | 1.33 | 2.25 | 1.25 | 3.0 |
| Rate of Cl$_2$ consumption during initial irradiation (COD equivalents per hr., mg./l./hr.) | 64 | 128 | 115 | 66 | 94 | 124 |
| Amount of organic compound added (g.) | 5.0 | 4.0 | 1.9 | 0.78 | 3.0 | 2.0 |
| (COD equivalents, mg./l.) | 5,820 | 4,250 | 2,020 | 1,650 | 9,350 | 7,100 |
| Rate of Cl$_2$ consumption after addition of organic material (COD equivalents per hr., mg./l./hr.) | 767 | 800 | 320 | 670 | 1,150 | 607 |
| Increase in rate of Cl$_2$ consumption caused by addition of organic compound (percent) | 1,200 | 580 | 268 | 1,030 | 1,160 | 4,540 |

[1] The chlorine concentrations are expressed in COD equivalents (mg./l.).

It will be noted that the increase in chlorine consumption varied from 268 percent to 4540 percent under irradiation.

EXAMPLE III

In a similar experiment it was found that other organic substantially, namely, phenol (61%—eight minutes), 2,4-dinitro phenol (53%—ten minutes), glycine (61%—four minutes), formic acid (90%—four minutes) and ortho dinitro benzene (65%—ten minutes) are also rapidly oxidized to the extent and in the time listed. However, acetic acid, benzoic acid and ethanol are also oxidized under the same conditions, but at a slower rate.

EXAMPLE IV

A waste water effluent of a sewage treatment plant is also oxidized by chlorine. The exact content other than "sewage" of the impurity therein is otherwise indefinite. This effluent had a nitrogen content as nitrate of 10.6 parts per million and an ammonia content of one part per million. The average chemical oxygen demand (COD), a measure of the organic content of the effluent, was 22.0 parts per million.

The following table sets forth the results obtained by oxidation of several samples of this water.

EXTENT OF COD ELIMINATION

| Experiment Number | pH | Initial chlorine concentration (p.p.m.) | Ultraviolet irradiation time (min.) | Extent of COD elimination after treatment in the dark and after irradiation [a] (percent) |
|---|---|---|---|---|
| 1 | 8.5 | 175 | 15 | 49.5 |
| 2 | 8.5 | 192 | 10 | 43.2 |
| 3 | 8.5 | 102 | 15 | 35.7 |
| 4 | 6.5 | 175 | 10 | 52.0 |
| 5 | 6.5 | 175 | 15 | 59.6 |
| 6 | 6.5 | 102 | 15 | 68.8 |
| 7 | 6.5 | 192 | 10 | 59.5 |
| 8 | 8.5 | 175 | 10 | 53.8 |

[a] The percentages were calculated after adjusting the initial COD values to account for the dilution which occurs when chlorine water is added.

tity of active halogen for oxidation as well as the quantity of UV energy may be minimal, or considerably reduced, as stated above, for effective destruction of the living bacteria. For instance, in ordinary germicidal operations using a UV lamp, normally it would require a substantial and even sterilizing dose of radiation where radiation alone is used thereon. Again, if chlorination were used alone, a high content of chlorine would be required. However, where oxidation is effected using an active halogen compound together with UV irradiation for disinfection of water, less radiant energy and lower active halogen concentrations will usually be effective. Similarly, for a given concentration of halogen, more rapid disinfection can be achieved when UV radiation is applied and the total amount of disinfection is more extensive than the cumulative effect of radiation and halogen acting indepently.

Moreover, in the case of flowing water, since the oxidation effect, as stated, is not a result of increasing concentrations, smaller increments of active halogen compound may be used i.e. as little as one-tenth part per million can be added in sequentially added portions to the flowing water as it moves in proximity to the sources of UV irradiation. That irradiation for bactericidal effect is illustrated in the following example.

EXAMPLE V

A clear stream of water having a bacterial count of 5000 per cc. is flowed through UV transparent glass tubing at a rate of one gram per minute per linear foot. It is charged at five foot intervals with chlorine water to impart at each of these inlets one part per million of active halogen at a pH of 5.5. It is irradiated at a wave length of 350–370 m$\mu$, whereby a total of fifteen parts per million of active chlorine was imparted to the water. The water duct is a half inch diameter glass pipe, transparent to the UV light. At the end of the five minute treatment, water samples are taken one minute after treatment by the third light exposure and are found to have a bacterial count of about an average of two bacteria per cc.

EXAMPLE VI

A suspension of the bacterium *Escherichia coli* was prepared in chlorine-free, chlorine-demand-free water buffered at pH 6.5 with a 1% concentration of phosphate buffers. The suspension contained $8 \times 10^4$ bacterium per ml. In four parallel experiments, samples of the suspension were treated with (1) sufficient chlorine to produce a concentration of 0.005 part per million for a period of five seconds, during which time the mixture was irradiated by radiation from a high-pressure mercury arc using a quarter inch thick borosilicate glass plate to filter out most of the radiation of wave length below 300 m$\mu$; (2) the same amount of chlorine for five seconds with no irradiation; (3) no chlorine and a five second irradiation; and (4) no chlorine and no irradiation. At the end of each experiment one drop of 0.01 N sodium thiosulfate was added to each reaction mixture.

A biological assay indicated that the chlorine alone produced a 12% decrease in the bacteria concentration and that the irradiation alone produced a 6% decrease. However, the combination of irradiation and chlorine produced a 36% decrease in bacteria concentration or twice as much bactericidal effect as the sum of the individual chlorine and irradiation effects.

EXAMPLE VII

A suspension of the amoeba, *Naegleria gruberi*, in distilled water, was diluted to provide a concentration of 20–30 amoeba per drop. Two 10 ml. samples of the amoeba suspension were treated with 10 ml. portions of chlorine water buffered to pH 6.5. The resulting chlorine concentrations were 1.8 p.p.m. In two control experiments, distilled water buffered to pH 6.5 was added to the amoeba suspension. One of the chlorinated mixtures and one of the non-chlorinated mixtures was allowed to stand in the dark for 7 minutes and was exposed to radiation from a high-pressure mercury arc lamp for three minutes and was then treated with sodium thiosulfate to destroy the remaining chlorine. The mixtures which were not irradiated were also treated with thiosulfate in the same manner after a ten minute period.

One drop of each mixture was spotted at five locations on Czapek's agar. After three days incubation at room temperature, a count on the surviving organisms indicated that the combination of irradiation and chlorine had been several times more effective in destroying the amoeba than either the chlorine alone or the irradiation alone.

Water can be treated batchwise in containers equipped with stirrers or continuously as it flows. It can be waste water from various industries by which the impurity content, the quantity of halogen, the time and degree of irradiation will vary from industry to industry. It is considered that waste waters of such industries having impurities typical of the industry, such as blast furnaces and steel mills wherein the waste is largely inorganic chemicals; explosives industry; motor vehicles and parts i.e. metal working industries; paper mills; textile mills; petroleum refining industries including refining, producing and drilling wherein a large component of the waste water is hydrocarbon; meat packing and poultry industry; dairy industries; plastic materials and resins, and others. For such industries waste compounds contained in the water may be ferrous, manganese, copper compounds, amino acids, cellulose and carbohydrates and hydrocarbons as well as dissolved or suspended organic and inorganic materials including ordinary sewage components such as the effluent waters of sewage treatment plants variable in nitrogen and ammonia contents. Other organic and inorganic contaminants such as humic and fulvic acids, ferrous and manganese compounds and other impurities which contaminate water in the natural environment can also be effectively removed by the light-activated halogen oxidation process.

Apparatus useful for such various water treatment as described, particularly in Examples 4 and 5, is illustrated in the single figure of drawing representing a series of treatment stations.

As shown in this figure, water passing in the direction of the arrow 10 through the treatment apparatus encounters a baffle 12 over which it must pass in continuous flow so that the depth of the water in passing over baffle 12 is reduced to whatever depth is practical with respect to the flow rate and rate of treatment, usually not exceeding five inches, typically two to five inches. At that point an ultraviolet light lamp 14 is mounted and is irradiated downward upon the water with maximum intensity on the surface of the flowing water at the top of the baffle. A source of halogen such as chlorinated water feeds the active halogen, entering the body of flowing water through nozzles 16 controlled by valves 18, each of which communicate with a pipe 20 through which chlorinated water is supplied to the system. That source of activated halogen may be disposed at the side of the baffle, to contact the water before baffling to shallow depth, and several such active halogen supply ducts may be mounted before or even after each actinic light treating station, the first being lettered A and the second B, etc., for as many treating stations as are practical, to effectively treat the flowing water. The water passes onward from treating station to station in seires, being irradiated at each station, and the quantity of the halogen is adjusted as it is used from station to station.

In an alternate construction, not shown, the ultraviolet ligh source may be disposed within the body of water suitably waterproofed so that the water may flow thereover and be exposed to light, thus being irradiated within the body of water.

It is preferred, as shown, to dispose the source of ultraviolet light as a series of light emitting UV tubes within a reflector body 22 having an internal curved highly-polished metal surface to reflect the light downward upon the water. The reflector may be curved and for this purpose may be parabolically shaped to reflect the light linearly downward upon the water for optimum penetration.

What is claimed is:

1. Process of purifying waters contaminated with oxidizable impurity components comprising oxidizing the contaminating components in said water at a pH below about 8.5 and ranging downward to substantially acidity with from about 5 to 300 parts per million of active halogen compound while exposing said halogen-containing contaminated water for a short period of less than about thirty minutes to actinic radiations in the range of 250 to 550 mu including a substantial portion of radiations below about 300 mu produced at an intensity sufficient to impart to the water from about 1 to 50 watt-minutes per gallon for oxidation of organic and inorganic impurities from a source maintained in relatively close proximity to said water.

2. The process as defined in claim 1 wherein the source of halogen is hypohalous acid.

3. The process as defined in claim 2 wherein the hypohalous acid is generated in the water by addition of free elemental halogen to the water.

4. The process as defined in claim 1 wherein the active halogen compound is selected from the group consisting of a hypochlorite, hypobromite and hypoiodite of an alkali-forming metal, chlorinated tri-sodium phosphate, elemental chlorine, elemental bromine, elemental iodine and chloramines.

5. The process as defined in claim 1 wherein the actinic light is radiated in a wave length ranging from about 250 to 550 mu from an electric arc source disposed in close proximity to the water being exposed.

6. The process as defined in claim 1 wherein the actinic light is radiated in intensity sufficient to impart from 1 to 30 watt-minutes per gallon.

7. The process as defined in claim 1 wherein the pH of the water is the ambient pH developed by addition of said active halogen compound during said oxidation, substantially from neutral to slightly acidic.

8. The process as defined in claim 1 wherein the pH of the water is maintained slightly acidic in a pH range of about 4 to 6.

9. The process as defined in claim 1 wherein the water is maintained at a neutral to slightly acidic pH, chlorine is added in increments each less than sufficient to completely oxidize the impurity, the water being exposed to an actinic light source irradiating at an intensity to provide 1 to 50 watt minutes per gallon for a period of five to forty minutes, and the total chlorine added over that time is sufficient to effect the desired degree of oxidation.

10. The method as defined in claim 1 wherein the water treated is selected from the group consisting of:
  (a) effluent water of sewage treatment plants;
  (b) effluent industrial waters of an organic materials processing plant wherein the impurities are substantially waste substances;
  (c) effluent water of a petroleum installation wherein the waste water is contaminated with hydrocarbon;
  (d) waters contaminated with microorganisms;
  (e) effluent industrial waters containing organic compounds of phosphorous;
  (f) effluent waters wherein a large contaminant is ammonia; and
  (g) highly nitrified low ammonia-containing effluent of sewage treatment plants.

11. The process as defined in claim 1 wherein the contaminated water source is derived from the group consisting of wells and reservoirs, drainage canals, river water and lake water, and the contaminating components include inorganic salts of iron and manganese.

12. The process as defined in claim 11 wherein the contaminating components include organic materials derived from the natural environment.

13. The process as defined in claim 11 wherein the contaminating components are synthetic insecticides, herbicides or pesticides.

14. The process of disinfecting waters contaminated with microorganisms comprising oxidizing said microorganisms with free available halogen at a pH from about neutral to slightly acid with less than about forty parts per million of active halogen compound while exposing said water for a short period of less than about five minutes to actinic radiations in the range of 250 to 550 m$\mu$ including a substantial portion below about 300 m$\mu$ produced from a source maintained in close proximity to said water, irradiating at an intensity sufficient to impart less than 5 watt minutes per gallon of water.

15. The process as defined in claim 13 wherein the active halogen compound is supplied to said water at a rate to maintain a concentration less than sufficient to completely oxidize said microorganisms, the water being exposed for a period long enough to oxidize sufficient to destroy said microorganisms.

16. The process as defined in claim 13 wherein the oxidation effected is sufficient to completely oxidize the organic substance of said microorganisms.

17. The process as defined in claim 13 wherein the waters contaminated with microorganisms are derived from the group consisting of waters from wells, reservoirs, drainage canals, river water and lake water.

18. The process as defined in claim 14 wherein the waters contaminated with microorganisms are effluents from biological sewage treatment plants.

19. The process as defined in claim 14 wherein the active halogen compound is supplied in small increments over a period of less than five minutes while exposing the water to the actinic light source, the emitting radiations being in the range of 250 to 500 m$\mu$, including a substantial portion below about 300 m$\mu$, at an intensity of 0.1 to 1 watt-minutes per gallon flow.

References Cited

UNITED STATES PATENTS

| | | | |
|---|---|---|---|
| 2,161,045 | 6/1939 | Hirschkind et al. | 204—157.1 X |
| 3,487,937 | 1/1970 | Koulovatos | 210—195 |
| 1,418,013 | 5/1922 | Newman et al. | 210—62 X |
| 2,041,584 | 5/1936 | Adler | 210—62 X |
| 2,070,285 | 2/1937 | Lissauer et al. | 210—62 X |
| 2,288,330 | 6/1942 | Stevenson | 210—62 |
| 3,445,383 | 5/1969 | Horvath et al. | 210—62 |

FOREIGN PATENTS

| | | | |
|---|---|---|---|
| 590,893 | 1/1960 | Canada | 210—62 |

OTHER REFERENCES

Derby, R. L., Chlorination of Deep Reservoirs for Taste and Odor Control, J. Awwa, vol. 48, July 1956, pp. 775–780 (GP. 176).

Conroe, K. E., et al., Light-Promoted Reactions of Hypochlorite with Organics, Water and Sewage Works, vol. 113, July 1966, pp. 237–240 (GP. 176).

MICHAEL ROGERS, Primary Examiner

U.S. Cl. X.R.

210—62

UNITED STATES PATENT OFFICE
CERTIFICATE OF CORRECTION

Patent No. 3,649,493        Dated    March 14, 1972

Inventor(s) ALFRED MEINERS, ET. AL.

It is certified that error appears in the above-identified patent and that said Letters Patent are hereby corrected as shown below:

Claim 15, line 1; claim 16, line 1 and claim 17, line 1, "13" should read -- 14 -- .

Signed and sealed this 6th day of August 1974.

(SEAL)
Attest:

McCOY M. GIBSON, JR.                  C. MARSHALL DANN
Attesting Officer                    Commissioner of Patents